United States Patent [19]

Genetti et al.

[11] 4,102,868
[45] Jul. 25, 1978

[54] COMPOSITION AND PROCESS FOR THE PREPARATION OF SEGMENTED POLYESTER-URETHANE POLYMERS

[75] Inventors: Ralph A. Genetti, Copley; Chester D. Trivette, Jr., Akron, both of Ohio

[73] Assignee: Monsanto Company, St. Louis, Mo.

[21] Appl. No.: 714,626

[22] Filed: Aug. 16, 1976

[51] Int. Cl.$^2$ .................. C08G 18/08; C08G 18/42
[52] U.S. Cl. .................................. 260/858; 528/76; 528/83
[58] Field of Search ............... 260/75 NE, 77.5 AA, 260/75 NP, 77.5 AM, 858

[56] References Cited

U.S. PATENT DOCUMENTS

| 2,880,192 | 3/1959 | Coffey et al. ................ 260/858 |
| 3,310,533 | 3/1967 | McElroy ..................... 260/75 NE |
| 3,488,302 | 1/1970 | Pipon ......................... 260/75 NP |
| 3,553,172 | 1/1971 | Thoma et al. ............... 260/77.5 AQ |
| 3,686,146 | 8/1972 | Goto .......................... 260/75 |
| 3,963,679 | 6/1976 | Ullrich et al. ............. 260/77.5 AA |

OTHER PUBLICATIONS

Journal of Applied Polymer Science, vol. 5, No. 13, (1961), pp. 108–114.

*Primary Examiner*—H.S. Cockeram

[57] ABSTRACT

A process for preparing segmented polyester-urethane polymers and polymers made by the process are described.

Organic solvents are not required, and the process minimizes randomization resulting from ester interchange. The polymers resulting from the process exhibit generally low hysteresis over a wide temperature range, depending on the composition, and are suitable for tires, hoses, belts, and gaskets. Molding by extrusion, injection and compression techniques can be employed.

37 Claims, No Drawings

COMPOSITION AND PROCESS FOR THE PREPARATION OF SEGMENTED POLYESTER-URETHANE POLYMERS

This invention relates to compositions and processes for preparing compositions of segmented urethane polymers, particularly, to processes adaptable to the continuous production of such polymers and to improved urethane polymers prepared thereby.

BACKGROUND OF THE INVENTION

Segmented polyester-urethane polymers wherein two dissimilar diol moieties are linked via reaction with a diisocyanate are known. For example, U.S. Pat. No. 2,880,192, Iwakura et al, *J. App. Polymer Sci.*, V, 108–115 (1961) and U.S. Pat. No. 3,553,172.

When the glass transition temperatures of the two diol moieties of the polymer are different, i.e., one is substantially above ambient temperature and the other is below ambient temperature, the polymer is elastoplastic. The aforesaid elastoplastic polyurethanes are generally prepared in batch processes in solution using a high boiling solvent. The solvent process suppresses ester interchange but is undesirable from the industrial standpoint because of the long reaction times and because of the ecological problems associated with organic solvents and the energy required to remove the solvent from the polymer. Melt processes wherein the reaction is carried out in the absence of solvent have not gained acceptance because moderately low reaction temperatures are required to avoid randomization of the copolymer due to the ester interchange reaction which occurs between polyesters at elevated temperature. A process has now been discovered for making segmented polyester-urethane block polymers without using organic solvents which process minimizes randomization resulting from ester interchange. Moreover, certain polymers made by the new process exhibit improved properties compared to polymers of similar compositions prepared in an inert solvent.

SUMMARY OF THE INVENTION

It has been found that elastoplastic segmented urethane polymers can be prepared by heating a slurry of at least one liquid polydiol and a pulverulent high melting dihydroxy polyester in the presence of an organic diisocyanate to a temperature sufficient to melt the solid polyester for a time sufficient to form an essentially linear segmented urethane polymer and cooling the polymer so formed before substantial degradation occurs. Before the pulverulent high melting polyester melts, the liquid polydiol reacts with the diisocyanate forming an isocyanate-terminated prepolymer. Upon melting, the previously solid polyester reacts with the prepolymer to form a linear urethane polymer consisting essentially of segments of the liquid polydiol and segments of high melting polyester attached through urethane moieties derived from the diisocyanate. Thus, the process of the invention is suitable for preparing segmented urethane polymers consisting essentially of segments (a) derived from at least one liquid polydiol having a melting or softening point of 100° C or below, segments (b) derived from dihydroxy polyester having a melting point of at least 200° C, preferably, 225° C or above, and segments (c) derived from an organic diisocyanate.

In the process of the invention, a slurry is prepared by dispersing a solid polyester in pulverulent form in a liquid polydiol. The solid polyester is reduced to a dispersible powder by grinding the polymer to discrete small size particles. Typically, essentially all of the particles (>99 wt. percent) are less than one millimeter in diameter, 75 weight percent of the particles being less than 0.7 millimeter in diameter and 50 weight percent or more of the particles being between 0.3–0.7 millimeters in diameter. Generally, particles having an average diameter of 3 millimeters or more to 0.1 millimeters or less are suitable with particles having an average diameter of one millimeter or less being preferred. Both the solid polyester and the liquid polydiol are dried at elevated temperatures under reduced pressure before use. The organic diisocyanate may be added to the slurry or it may be added to the liquid polydiol prior to the preparation of the slurry. The slurry containing diisocyanate is heated with stirring in a moisture-free system (either a closed system or a system blanketed with dry nitrogen). As the temperature increases, the organic diisocyanate reacts with the liquid polydiol forming isocyanate-terminated prepolymer. While the high-melting polyester remains a solid, there is essentially no reaction between it and the liquid polydiol, organic diisocyanate or isocyanate-terminated prepolymer. When the temperature is raised sufficiently to melt the solid polyester, the prepolymer reacts rapidly with the now molten high-melting polyester via a chain-extension mechanism to give essentially linear segmented urethane polymer. The amount of mixing necessary and, consequently, the time necessary to complete the reaction are significantly reduced due to the intimate association of the reactants in the initial slurry. However, especially in batch processes, it is recommended to stir the slurry and subsequent molten reaction mixture until the reaction is complete. As soon as the reaction is complete, the polymer is immediately cooled to 200° C or below. The shorter reaction time required for complete reaction permits quenching the urethane polymer sooner thereby reducing the total heat history to which it is exposed which shorter time reduces polymer degradation including minimizing randomization between segments of the polymer.

As indicated, the process of the invention comprises heating the slurry to a temperature above the melting point of the solid polyester. The heating step to melt the high-melting polyester in the slurry to effect reaction is not to be confused with the heating step to liquefy a diol-melting above room temperature but below about 100° C. The aforesaid liquidized polydiol merely provides a liquid media from which the slurry is made by dispersing therein solid high-melting polyester. The slurry so formed then must be heated to a higher temperature to melt the solid polyester and to effect the reaction forming segmented urethane polymer. The slurry heating step may be carried out by charging the slurry to a jacketed reactor having a means of alternately heating and cooling the reactor, for example, by feeding hot or cold fluids through the jacketed portion of the reactor. Alternatively, a reactor, preferably with stirring means, containing slurry may be lowered into a heated bath for the required length of time and withdrawn from the bath when the reaction is complete. One advantage of the subject process is the high reaction temperatures which give relatively short reaction times which makes the process readily adaptable for continuous operation. In a continuous process, a slurry is continuously fed to a zone heated to a temperature above the melting point of the solid polyester and molten urethane polymer is continuously withdrawn provided the feed rate and volume of the heated zone is sufficient to provide the necessary residence time to melt the polyester and complete the reaction. The requisite residence time for any given reactor volume, feed rate, reaction temperature, and slurry composition is readily determined empirically by a few simple experiments. For example, a slurry may be fed continuously to a zone heated to 250° C or higher wherein the total elapsed time within the heated zone (for a given volume of slurry) is 30 minutes or less. At higher temperature, even shorter times within the heated zone are necessary, for example, at 280° C or higher the total elapsed time within the heated zone may be 15 minutes or less. At 275° C, satisfactory segmented urethane polymer can be produced with a total elapsed time of 2 minutes or less.

It is desirable to impart movement to the slurry to maintain the dispersion of particles and, upon melting of the solid polyester, to facilitate its further mixing with the liquid prepolymer. In carrying out the process in a continuous manner, a mixing means is not always essential because the flow of the slurry (or resultant molten stream) through the heated zone imparts sufficient movement to effect mixing. However, sometimes it is desirable to induce further mixing by feeding the slurry (and molten stream) through a heated channel having stream dividers such as in a static mixer or by forcing the stream through a heated channel containing a series of baffles. Alternatively, the slurry may be fed through a heated channel containing one or more revolving screws, paddles and the like. A two-screw mixing extruder having a barrel capable of being heated to above 200° C, preferably 250° C or higher, is especially useful for this purpose.

It is desirable to cool the molten urethane polymer to a temperature below 200° C, preferably below 150° C, as soon as it exits from the heated zone to suppress degradation of the polymer and especially to suppress randomization of the polymer segments. The aforesaid cooling may be effected by discharging the molten urethane polymer into an atmosphere or liquid at ambient temperature. A preferred means for cooling the molten polymer comprises discharging the molten polymer directly upon revolving chilled rolls thereby effecting rapid cooling and simultaneously forming slabs, rods or sheets of the solidified polymer. The solidified polymer may be pelletized or ground (for example, by feeding through a Wiley mill) to obtain a free-flowing powder. Regardless of the form of the final product, the polymer produced may be formed into articles by conventional methods for thermoplastic material such as by extrusion or by compression or injection molding.

The process is applicable to any quantity of liquid polydiol and high melting polyester as long as the quantity of diisocyanate is sufficient so that the number of NCO groups equals or exceeds the total number of OH groups. Typically, the process comprises heating a slurry containing about 10 to about 90 weight percent liquid polydiol and about 90 to about 10 weight percent high melting polyester, and sufficient organic diisocyanate to react with all the hydroxy groups present. The process is especially suitable for preparing low hysteretic polymers by heating a slurry containing about 40 to about 80 weight percent of liquid polydiol, about 60 to about 10 weight percent of poly(ethylene terephthalate) or poly(tetramethylene terephthalate) and about 2 to about 15 weight percent of an organic diisocyanate. Although not essential, it is advantageous that at least one of the liquid polydiol or solid polyester has a molecular weight of at least about 1800 and the sum of their molecular weights does not exceed about 14,000. The process is especially suitable for a slurry comprising about 50 to about 75 weight percent of liquid polydiol and about 50 to about 25 weight percent of solid polyester wherein the molecular weights of liquid polydiol and solid polyester are between about 1800 and about 5500.

One embodiment of the invention comprises segmented elastoplastic urethane polymer prepared by heating at 225° C or higher a slurry consisting essentially of (a) about 40 to about 80 weight percent of at least one liquid dihydroxy polyester of the formula

or liquid polyether of the formula $H(OR_2)_nOH$ wherein R is alkylene of 2 to 10 carbon atoms or said alkylene interrupted by oxygen, $R_1$ is alkylene of 2 to 8 carbon atoms, $R_2$ is alkylene of 2–4 carbon atoms and $n$ is 2 to about 50, (b) about 60 to about 10 weight percent hydroxy-terminated poly(tetramethyleneterephthalate) or hydroxy-terminated poly(ethyleneterephthalate) having a molecular weight from about 1000 to about 12,000, and (c) about 2 to about 15 weight percent organic diisocyanate, wherein the NCO/OH ratio is one or more, for a time sufficient to form essentially linear segmented urethane polymer. Said segmented elastoplastic urethane polymers exhibit lower hysteresis than polymers of similar composition prepared in an inert solvent. The distribution of polymer segments of polymers prepared by the above-described slurry process is believed to be different from the distribution of polymer segments of polymers prepared by a solvent process which difference in distribution probably accounts for the improved properties of the polymers. Polymers in which (a) is a polyester are preferred. More preferred polymers exhibiting lower hysteresis consist essentially of about 50 to about 75 weight percent segments derived from at least one dihydroxy-terminated polyester having a melting point of 50° C or less, and a molecular weight of from about 1000 to about 12,000, preferably about 1800 to about 6000, and about 50 to about 25 weight percent segments derived from poly(tetramethyleneterephthalate) having a molecular weight of about 1800 to about 6000. The extreme of the ranges cannot occur simultaneously. For example, in a polymer containing 60 weight percent of high melting-polyester, the amount of low-melting polydiol must be less than 40 weight percent so that enough organic diisocyanate is present to form the segmented polymer, in which case the combined weights of (a) and (c) totals 40 weight percent.

The aforesaid improved polymers exhibiting lower hysteresis are particularly useful in articles subjected to flexing during use since the left of the article is extended because it operates at a lower temperature (does not heat up as much) than a similar article prepared with polymers exhibiting higher hysteresis. The lower hysteretic polymers of the invention exhibit lower hysteresis over a wide temperature range with the range varying depending upon the composition. Polymers containing symmetrical diisocyanates exhibit lower hysteresis over a wider range of temperatures than polymers containing unsymmetrical diisocyanates. For example, a polymer of the invention derived from a symmetrical diisocyanate exhibits 10 to 50% lower hysteresis over the temperature range of 0°–100° C than a polymer of similar composition prepared in an inert solvent, whereas, a polymer of the invention derived from an unsymmetrical diisocyanate exhibits 10 to 50% lower hysteresis over the temperature range of 0°–70° C. The degree of improved hysteresis varies somewhat depending upon whether hysteresis is measured with a torsion pendulum or Rheovibron and depending upon the temperature at which the measurement is made. Nevertheless, over a wide range of operating temperatures, the improved polymers prepared by the slurry process exhibit significantly lower hysteresis than polymers of similar composition prepared in an inert solvent. For example, hysteresis of the polymers of the invention measured by Rheovibron at 60° C is at least 75% or less of the hysteresis of a polymer of similar composition prepared in an inert solvent.

The physical properties such as stiffness, strength and melt peak of the improved polymers of the invention are dependent upon the relative proportions of segments (a), (b) and (c) in the polymer, the particular low-melting polydiol and high-melting polyester from which segments (a) and (b) are derived and the molecular weights of the low-melting polydiol and high-melting polyester from which segments (a) and (b) are derived. Generally, polymers containing larger amounts of segments derived from high-melting polyester exhibit higher tensile strength and higher melting peaks. However, the molecular weights of the polydiol and polyester from which the polymer is made exert a significant influence on polymer properties with the effect of molecular weight varying somewhat depending upon the relative proportion of (a) and (b) in the polymer. Typically, increasing the molecular weight of either (a) or (b) results in polymers having higher melt peaks. Polymers exhibiting a desirable combination of properties such as high tensile strength, high melt peak and moderate stiffness are obtained when at least one of (a) or (b) has a molecular weight of 3000 or more. Preferred segmented elastoplastic urethane polymers are obtained when the sum of the molecular weights of the (a) and (b) exceeds 5000. More preferred segmented elastoplastic urethane polymers of the invention are obtained when both (a) and (b) have molecular weights of 3000 or more. Of course, it is understood that the properties of the polymers of the invention may vary depending upon the amount of diisocyanate reacted. As indicated above, it is essential that a sufficient quantity of diisocyanate is present to react with all of the hydroxy radicals present. Preferably, an excess of diisocyanate is used with the NCO/OH ratio being between 1.1 and 1.3.

Preferred polymers contain segments derived from saturated polyesters prepared from aliphatic dicarboxylic acids (or esters) and aliphatic dihydric alcohols which are liquid at 50° C or below, preferably being liquid at room temperature. More preferred polymers contain segments derived from polyesters prepared from symmetrical dicarboxylic acids and alkylene diols (glycols) of 2–4 carbon atoms.

Polymers containing segments derived from polytetramethylene terephthalate are particularly recommended.

Any dihydroxy polyether or dihydroxy polyester having a molecular weight of from about 500 to about 12,000 which is a liquid at a temperature of 100° C or below, preferably, a liquid at room temperature, is satisfactory for carrying out the process of the invention. Preferred polyesters of polyethers have a glass transition temperature (Tg) below room temperature. The liquid polyesters are prepared by conventional techniques by esterfication of one or more dicarboxylic acid with one or more dihydric alcohol (MW 300 or less) or by ester interchange of one or more dicarboxylic acid alkyl ester with one or more dihydric alcohol. Liquid polyethers and polyesters having a molecular weight between about 1800 and about 5500 are preferred. Examples of suitable dihydroxytermined liquid polyesters are poly-2,2-dimethylpropylene adipate (PDMPA), polytetramethylene adipate (PTMA), poly-1,3-butylene adipate (P-1,3-BA), polyoxydiethylene adipate (PODEA), poly-1,2-propylene adipate (PPA), polyoxydi-1,2-propylene adipate (POPA), polytriethylene glycol adipate (PTEGA), polytetraethylene glycol adipate (PTTGA), polyethylene succinate (PES), polytetramethylene adipate-co-succinate (PTMAS), polyethylene-co-propylene adipate (PEPA), polyethylene-co-butylene adipate (PEBA), polypropylene-co-tetramethylene adipate (PPMA), poly-tetramethylene-2-ethyl-3-n-propyl trimethylene adipate-co-glutarate (PBGA), polyethylene adipate (PEA), poly-(2-ethyl-3-n-propyl)propylene glutarate (PEPG), polyoxytriethylene succinate (POES), polytetramethylene succinate (PTMS), polycaprolactone (PCL), polytetramethylene azelate (PTMAZ), polytetramethylene sebacate (PTMSE), poly-1,3-butylene sebacate (P-1,3-BSE), poly-1,3-butylene succinate (P-1,3-BS), polytetramethylene glutarate (PMG), polypentamethylene glutarate (PPMG), poly-2,2-dimethylpropylene glutarate (PDMPG), and poly-1,2-propylene glutarate (PPGL). Additional examples of satisfactory liquid polyesters (which may be selected on the basis of Tg are shown in Table I, pages 31–59, *Polyesters*, Korshak and Vinogradova, Pergamon Press and Table II, pages 70–72, *Encyclopedia of Polymer Science and Technology*, Vol. 11, the disclosures of which are herein incorporated by reference. Mixtures of two or more different liquid polyesters may be used with good results.

Suitable dihydroxy-terminated liquid polyethers are produced by polymerization of alkylene oxide, cyclic ketones, tetrahydrofuran, epichlorohydrin, etc., examples of which are polytetramethylene glycol (PTMG), polypropylene glycol (PPG), polyethylene glycol (PEG) and polyhexamethylene glycol (PHMG).

Any high-melting dihydroxy polyester having a molecular weight of from about 500 to about 12,000 which is a solid at a temperature of 200° C or above, preferably, a solid at 225° or above, is satisfactory for carrying out the process of the invention. The high-melting polyesters are prepared by the conventional techniques indicated as being suitable for the liquid polyesters. High-melting polyesters having a molecular weight between about 1500 and about 8000 are preferred with molecular weights between about 2000 and about 6000 being more preferred. Examples of suitable dihydroxy-terminated high-melting polyesters are polyethylene terephthalate (PET), polytetramethylene terephthalate (PTMT), polytetramethylene isophthalate (PTMI), poly-(1,4-cyclohexane dimethylene)-co-tetramethylene terephthalate (PCHDMT), polytetramethylene naphthalene-2,6-dicarboxylate (PTMND), polyethylenenaphthalene-2,6-dicarboxylate (PEND), polyethylene diphenylmethane-4,4'-dicarboxylate (PEDPM), polyethylene-1,1'-diphenoxybutane-4,4'-dicarboxylate (PEDPB), polytrimethylene diphenylmethane-4,4'-dicarboxylate (PPMDP), polytetramethylene diphenyl-4,4'-dicarboxylate (PTMDP), polyhexamethylene diphenyl-4,4'-dicarboxylate (PHMDP), poly-1,4-cyclohexane succinate (PCHS), poly-1,4-cyclohexane glutarate (PCHG), and poly-1,4-cyclohexane adipate (PCHA). Additional examples of satisfactory high-melting polyesters (which may be selected on the basis of melting point) are shown in the references cited above in the paragraph on liquid polyesters. Preferred high-melting polyesters develop substantial crystallinity in a reasonable period of time. Polyalkylene terephthalates are preferred. Mixtures of one or more high-melting polyesters may be used, if desired.

Any organic diisocyanate is satisfactory for the practice of the invention. Aliphatic diisocyanates, aromatic diisocyanates or mixtures thereof are suitable with hydrocarbon diisocyanates, i.e., diisocyanates containing only carbon and hydrogen except for the nitrogen and oxygen of the isocyanate groups comprising an important class. Hydrocarbon diisocyanate of 4 to 24 carbon atoms (including the carbon atoms of the isocyanate groups) comprises and important subclass. Straight and branched chain alkylene diisocyanates of 6 to 12 carbon atoms and arylene diisocyanates of 8 to 16 carbon atoms containing 6 or 10 ring carbon atoms (including alkylene-diphenylene diisocyanates) are preferred. Symmetrical diisocyanates are more preferred. Cycloalkylene diisocyanates are also satisfactory. Examples of satisfactory organic diisocyanates are tetramethylene diisocyanate (TMDI), hexamethylene diisocyanate (HDI), 1,4-cyclohexylene diisocyanate (CHDI), octamethylene diisocyanate (ODI), decamethylene diisocyanate (DDI), dodecamethylene diisocyanate (3DI), p-phenylene diisocyanate (PBDI), m-phenylene diisocyanate (MBDI), toluene diisocyanate (TDI), diphenyl-4,4'-diisocyanate (DPDI), methylenediphenyl-4,4'-diisocyanate (MDI), methylene-dicyclohexylene-4,4'-diisocyanate ($H_{12}MDI$), trimethylhexamethylene diisocyanate (TMHDI), naphthalene diisocyanate (NDI), chlorophenylene diisocyanate (CDI), p-xylylene diisocyanate (PXDI), m-xylylene diisocyanate (MXDI), dimethyl hexamethylene diisocyanate (DMHDI), tetramethyl phenylene diisocyanate (TMDBI), and diphenyldimethylmethane-4,4'-diisocyanate (DMMDI).

The polymers prepared by the process of the invention are useful for making a variety of articles such as tires, hoses, belts, gaskets, moldings and molded parts. Articles may be prepared by any suitable procedure but due to thermoplasticity of the polymers articles are readily prepared by extrusion, injection molding and compression molding techniques. The polymers may be modified by incorporating conventional compounding ingredients therein such as, reinforcing agents, fillers, extenders, pigments, antidegradants, fire retardants, plasticizers, resins or other polymers.

The stress-strain properties of the polymers are determined in accordance with the test procedures set forth in ASTM D-1708 at a cross-head speed of about 5cm/min. Tension set is measured in accordance to ASTM D-412 using a T-50 test specimen. Hysteresis is determined by torsion pendulum in accordance to the method described by L. E. Neilsen *Rev. Sci. Instr.* 22, 690(1951) or by dynamic viscoelastometer (Rheovibron) in accordance to the method described by M. Yoshino and M. Tokayanogi, *J. Japan Soc. Test. Matr*, 8, 330 (April 1959). Thermal properties are determined using a Perkin-Elmer DSC-1B Differential Scanning Calorimeter.

DESCRIPTION OF THE PREFERRED EMBODIMENTS

The liquid dihydroxy polyesters and high-melting dihydroxy polyesters shown below to illustrate the invention are prepared by conventional esterification procedures. For example, hydroxy-terminated poly-1,3-butylene adipate (P-1,3-BA) is prepared by charging to a suitable reactor adapted with heating means, stirring means and distillation column adipic acid (15 moles), 1,3-butylene glycol (22.5 moles) and 3 grams of substituted diphenylamine antioxidant. The mixture is heated between 150°–200° C for 1.5–2 hours during which time most of the water and some diol is removed by distillation. Magnesium titanate catalyst (Catalyst B, Col. 7 of U.S. Pat. No. 3,784,520) (10 ml) is charged and the mixture is heated at 200°–205° C under decreasing pressure until the remaining water and additional quantities of diol are distilled from the reactor. Poly-1,3-butylene adipate of any desired molecular weight is obtained by varying the time and pressure of the second distillation step.

Hydroxy-terminated poly(1/1 ethylene-co-1,4-butylene)-adipate (PEBA) having a nominal molecular weight of 2000 (1940 molecular weight as determined by titration of the hydroxy groups with diisocyanate with the end point determined by infrared spectroscopy) is purchased (Mobay F-222). Samples of higher molecular weight PEBA are prepared by vacuum stripping at elevated temperature 1,4-butane diol and ethylene glycol from a quantity of the 1940 MW sample. Samples of lower molecular weight PEBA are prepared by charging to a suitable reactor a quantity of the 1940 MW sample of PEPA, and an 80/20 molar ratio mixture of ethylene glycol and 1,4-butane diol and heating the mixture under vacuum at 210°–215° C until the desired quantity of the mixed diols are distilled from the mixture.

Hydroxy-terminated poly(tetramethyleneterephthalate) (PTMT) is prepared by charging dimethyl terephthalate (28 moles), 1,4-butane diol (42.6 moles), substituted diphenylamine antioxidant 12g.), and magnesium titanate catalyst (same as above) (20 ml) to a suitable reactor. The temperature is gradually increased over a 4 hour period to 215° C while gradually reducing the pressure distilling off methanol, 1,4-butanediol and tetrahydrofuran from the reactor. The reaction mixture is blanketed with dry nitrogen at atmospheric pressure and the product allowed to equilibrate with stirring at 235° C for 15 minutes. The polyester is poured onto aluminum trays, cooled until it crystallizes and, while still warm, is stored in closed containers. The molecular weight of the PTMT is determined by titration with diisocyanate with the end point determined by infrared spectroscopy. Prior to use, the solid polyester is powdered by repeatedly passing the material through a two-roll mill or by grinding in a Wiley mill. Samples of different molecular weight are prepared by the aforesaid procedure by distilling more or lesser quantities of 1,4-butanediol from the reactor.

Other liquid dihydroxy polyesters and high-melting dihydroxy polyesters are either purchased or prepared by procedures similar to those illustrated above. Liquid dihydroxy polyethers shown below to illustrate the invention are purchased from commercial sources. Organic diisocyanates shown below to illustrate the invention are commercially available.

To illustrate the invention, a slurry is prepared by dispersing 43.5 parts by weight of pulverulent poly(tetramethylene terephthalate) molecular weight 6130 in 52.6 parts by weight of liquid poly(1/1 ethylene-co-butyleneadipate) molecular weight 4310 and 3.9 parts by weight of hexamethylene diisocyanate (NCO/OH 1.2). The slurry, preheated to 105°–110° C, is fed at the rates indicated through a heated reactor having a volume of 57 ml comprising a 2.54 cm ID cylindrical channel containing 12 Ross ISG static mixing elements each containing 4 channels of 4 mm diameter. Molten segmented urethane polymer discharges from the reactor onto two revolving rolls chilled by internally circulated cold water. The sheeted polymer is ground (Wiley mill), the ground polymer homogenized by blending and test specimens are prepared by compression molding polymer samples at 235° C for 3 minutes. Before measuring properties, the molded specimens are allowed to equilibrate for 24 hours. Twenty-four experiments at different feed rates and four temperatures are shown in Table I.

The data show that polymer properties are dependent on reaction conditions. For example, at all four temperatures, percent elongation and tension set decrease and melt peak increases with decreasing residence time (higher feed rates). The effect of residence time on tensile properties varies depending on temperatures. For eample, at 240° C tensile strength decreases with decreasing residence time with the data indicating that reaction times of more than 40 minutes are required for higher tensile strength while at 300° C tensile strength increases with decreasing residence time with the data indicating that high strength polymer is produced with residence times of less than 8 minutes and that excellent polymer is produced with residence times of less than 2 minutes. At 260° C, higher tensile strength polymer is obtained with residence times between 7–25 minutes while at 280° C high tensile strength polymer is obtained with residence times from 2 to more than 13 minutes with the higher tensile strength polymer obtained with a residence time of about 5 minutes. The appearance of the product issuing from the reactor indicates the homogeneity of the polymer. Clear product indicates a homogeneous polymer, whereas, cloudy product indicates that, although the reaction is essentially complete, the product has not sufficiently equilibrated to give a homogeneous product. The data demonstrate that elastoplastic polyurethane polymer can be produced in a solvent-free system in relatively short times at temperatures exceeding the dissociation temperatures reported for the urethane group.

TABLE I

| Example No. | Temp. °C | Rate g/min. | Residence time, min. | E, Kg/cm² | TS, Kg/cm² | Elong. % | Tension Set % | DSC mp, °C | DSC mr °C | DSC rp °C | Appearance |
|---|---|---|---|---|---|---|---|---|---|---|---|
| 1 | 240 | 1.3 | 43.8 | 421 | 429 | 790 | 13 | 185 | 160–206 | 118 | sl. cloudy |
| 2 | 240 | 4.4 | 13.0 | 397 | 385 | 660 | 10 | 205 | 160–214 | 140 | v. cloudy |
| 3 | 240 | 8.6 | 6.6 | 237 | 264 | 520 | 7 | 207 | 170–216 | 146 | opaque |
| 4 | 260 | 1.9 | 30.0 | 361 | 387 | 870 | 17 | 175 | 135–194 | 89 | clear |
| 5 | 260 | 2.5 | 22.8 | 342 | 406 | 820 | 15 | 180 | 140–200 | 100 | clear |
| 6 | 260 | 3.5 | 16.3 | 385 | 413 | 830 | 14 | 182 | 140–200 | 104 | clear |
| 7 | 260 | 7.3 | 7.8 | 422 | 436 | 820 | 14 | 190 | 145–208 | 120 | v. sl. cloudy |
| 8 | 260 | 10.5 | 5.4 | 327 | 354 | 670 | 11 | 201 | 160–212 | 135 | cloudy |
| 9 | 260 | 14.0 | 4.1 | 314 | 369 | 700 | 10 | 201 | 160–212 | 136 | v. cloudy |
| 10 | 260 | 17.0 | 3.3 | 257 | 333 | 660 | 8 | 204 | 160–214 | 145 | opaque |
| 11 | 280 | 1.3 | 43.8 | 255 | 283 | 1040 | 23 | 135 | 112–165 | — | clear |
| 12 | 280 | 4.3 | 13.0 | 410 | 403 | 960 | 15 | 175 | 132–192 | 110 | clear |
| 13 | 280 | 8.0 | 7.1 | 386 | 398 | 860 | 15 | 177 | 135–194 | 97 | clear |
| 14 | 280 | 10.5 | 5.4 | 469 | 451 | 960 | 13 | 190 | 142–204 | 130 | clear |
| 15 | 280 | 14.0 | 4.1 | 448 | 408 | 830 | 14 | 186 | 150–202 | 111 | clear |
| 16 | 280 | 16.0 | 3.6 | 493 | 351 | 850 | 11 | 199 | 160–214 | 139 | v. sl. cloudy |
| 17 | 280 | 24.0 | 2.4 | 440 | 400 | 780 | 12 | 194 | 152–210 | 127 | cloudy |
| 18 | 300 | 3.7 | 15.4 | 326 | 276 | 1090 | 24 | 130 | 100–160 | — | clear |
| 19 | 300 | 7.2 | 7.9 | 323 | 392 | 1040 | 20 | 147 | 110–168 | 72 | clear |
| 20 | 300 | 12.7 | 4.5 | 365 | 424 | 960 | 18 | 165 | 120–186 | 81 | clear |
| 21 | 300 | 17.2 | 3.3 | 417 | 440 | 940 | 16 | 170 | 124–190 | 87 | clear |
| 22 | 300 | 19.7 | 2.9 | 412 | 440 | 880 | 16 | 172 | 130–190 | 91 | clear |
| 23 | 300 | 24.7 | 2.3 | 419 | 404 | 820 | 15 | 177 | 140–196 | 100 | clear |
| 24 | 300 | 30.4 | 1.9 | 383 | 475 | 900 | 14 | 181 | 140–198 | 104 | clear |

To further illustrate the invention, a slurry is prepared by dispersing 43.8 parts by weight of pulverulent poly(tetramethyleneterephthalate) molecular weight 7710 in 53.0 parts by weight of poly(1/1 ethylene-co-butyleneadipate) molecular weight 4770 and 3.3 parts by weight of hexamethylene diisocyanate (NCO/OH 1.16). The slurry heated to about 110° C is fed at a rate of about 34–37g./min. through the same reactor as used in the experiments of Table I heated to about 290° C. Molten polymer is discharged from the reactor onto chilled rolls, sheeted, ground, and homogenized. Test specimens are prepared as before. The properties of the polymer are tensile strength 439 Kg./cm², Young's modulus 423 Kg./cm², 100% modulus 86 Kg./cm², elongation 870%, tension set 15% and melt peak 189° C.

The invention is further illustrated by charging to an appropriate reactor adapted with a stirring means, weighed quantities of low-melting polydiol and pulverulent high-melting polyester. The slurry is stirred for 15–20 minutes at 100°–110° C under vacuum to degas and dry the reactants, after which time the space above the slurry is filled with dry nitrogen. A predetermined amount of an organic diisocyanate is charged to the reactor and the slurry is heated with stirring at 100°–110° C for about 15 minutes. The reactor is inserted into a molten salt bath at the indicated temperatures and the slurry is stirred until the solid polyester melts and the appearance of the reaction mass indicates completion of the reaction. The reactor is then removed from the salt bath and allowed to cool at room temperature. Test specimens of the polymers are prepared and measured as described above. The results are shown in Tables 2–9.

Segmented elastoplastic urethane polymers comprising poly(tetramethylene terephthalate), hexamethylene diisocyanate and low-melting polyesters of poly(1/1 ethylene-co-1,4-butylene adipate), poly(1,2-propylene adipate) and poly(1,3-butylene adipate) are shown in Tables 2, 3 and 4, respectively. The experiments with poly(1/1 ethylene-co-1,4-butylene adipate) of Table 2 are carried out with salt bath temperatures of 278°–298° C for times of from 4 to 8.5 minutes with the majority of the experiments being carried out at temperatures of 284°–293° C for times of 5 to 7 minutes. The experiments with poly(1,2-propylene adipate) of Table 3 are carried out with salt bath temperatures of 260°–273° C for times of about 6–18 minutes with the majority of the experiments being carried out at temperatures of 264°–270° C for times of about 7 to 12 minutes. The experiments with poly(1,3-butylene adipate) of Table 4 are carried out with salt bath temperatures of 269°–283° C for times of about 5–15 minutes with the majority of the experiments being carried out at temperatures of 275°–280° C for times of about 7–12 minutes.

TABLE 2

| Ex. No. | PEBA pbw | PEBA mw | PTMT pbw | PTMT mw | HDI pbw | NCO/OH | E, Kg./cm² | TS, Kg./cm² | Ult. El. % | Tension Set, % | DSC mr,° C | DSC mp.° C | DSC rp,° C | Torsion Pend. Tx100 at 70° C | Torsion Pend. Tg,° C |
|---|---|---|---|---|---|---|---|---|---|---|---|---|---|---|---|
| 1 | 39.7 | 1050 | 47.9 | 2010 | 12.4 | 1.20 | 263 | 312 | 630 | 29 | 80–142 | 125 | — | 3.52 | −4 |
| 2 | 39.9 | 1050 | 50.6 | 5470 | 9.5 | 1.20 | 428 | 415 | 620 | 22 | 110–187 | 153 | — | 3.03 | −15 |
| 3 | 44.0 | 3040 | 48.3 | 2010 | 7.7 | 1.20 | 391 | 371 | 730 | 20 | 92–164 | 138 | 70 | 3.40 | −22 |
| 4 | 44.2 | 3040 | 51.0 | 5470 | 4.8 | 1.20 | 477 | 429 | 740 | 21 | 94–210 | 178 | 115 | 2.87 | −22 |
| 5 | 53.9 | 1050 | 32.5 | 2010 | 13.6 | 1.20 | 162 | 330 | 730 | 9 | 84–160 | 130 | 80 | 2.76 | −25 |
| 6 | 54.1 | 1050 | 34.3 | 5470 | 11.6 | 1.20 | 168 | 285 | 680 | 16 | 112–168 | 140 | — | 2.63 | −25 |
| 7 | 59.9 | 3040 | 32.8 | 2010 | 7.3 | 1.20 | 173 | 319 | 1050 | 12 | 110–210 | 182 | 77 | 3.00 | −35 |
| 8 | 60.1 | 3040 | 34.6 | 5470 | 5.3 | 1.20 | 228 | 376 | 920 | 11 | 110–190 | 167 | 80 | 2.80 | −35 |
| 9 | 36.2 | 1930 | 56.3 | 3380 | 7.4 | 1.25 | 975 | 476 | 630 | 27 | 142–210 | 195 | 126 | 2.50 | −15 |
| 10 | 43.1 | 660 | 42.5 | 3380 | 16.3 | 1.25 | 295 | 296 | 540 | 16 | 90–170 | 140 | — | 2.80 | −37 |
| 11 | 49.4 | 1930 | 39.1 | 1340 | 11.5 | 1.25 | 249 | 339 | 560 | 11 | 108–186 | 152 | — | 2.65 | −24 |
| 12 | 49.8 | 1930 | 42.2 | 3380 | 8.0 | 1.25 | 377 | 390 | 680 | 13 | 92–192 | 164 | 75 | 2.45 | −25 |
| 13 | 52.7 | 5100 | 42.5 | 3380 | 4.5 | 1.25 | 435 | 504 | 970 | 14 | 120–210 | 188 | 117 | 2.55 | −25 |
| 14 | 49.9 | 1930 | 43.7 | 9590 | 6.4 | 1.25 | 361 | 389 | 790 | 18 | 120–185 | 155 | — | 2.55 | −25 |
| 15 | 67.7 | 1930 | 23.4 | 3380 | 8.8 | 1.25 | 174 | 266 | 760 | 7 | 120–196 | 160 | — | 2.82 | −36 |
| 16 | 66.2 | 5100 | 28.4 | 5470 | 3.8 | 1.25 | 174 | 395 | 1040 | 7 | 144–208 | 182 | 108 | 2.39 | −40 |
| 17 | 77.7 | 5100 | 18.4 | 5470 | 3.9 | 1.25 | 61 | 252 | 1330 | 8 | — | — | — | 6.83 | −50 |
| 18 | 88.9 | 5100 | 5.7 | 5470 | 3.9 | 1.25 | 14 | 153 | 1380 | 9 | — | — | — | 7.79 | −50 |
| 19 | 39.3 | 1050 | 47.4 | 2010 | 13.3 | 1.30 | 443 | 346 | 540 | 18 | 112–180 | 150 | — | 3.51 | −15 |
| 20 | 39.6 | 1050 | 50.2 | 5470 | 10.2 | 1.30 | 473 | 361 | 660 | 28 | 110–180 | 148 | 62 | 2.96 | −14 |
| 21 | 43.7 | 3040 | 48.0 | 2010 | 8.3 | 1.30 | 374 | 504 | 820 | 16 | 140–208 | 182 | 110 | 2.70 | −15 |
| 22 | 44.0 | 3040 | 50.8 | 5470 | 5.2 | 1.30 | 548 | 406 | 700 | 20 | 130–194 | 177 | 114 | 2.65 | −22 |
| 23 | 53.3 | 1050 | 32.1 | 2010 | 14.5 | 1.30 | 149 | 196 | 620 | 11 | 102–188 | 157 | — | 2.35 | −24 |
| 24 | 53.6 | 1050 | 33.9 | 5470 | 12.5 | 1.30 | 197 | 266 | 650 | 12 | 82–164 | 120 | — | 2.76 | −22 |
| 25 | 59.5 | 3040 | 32.6 | 2010 | 7.8 | 1.30 | 214 | 323 | 800 | 8 | 130–200 | 178 | 80 | 2.60 | −34 |
| 26 | 59.9 | 3040 | 34.5 | 5470 | 5.7 | 1.30 | 240 | 442 | 950 | 9 | 119–190 | 168 | 77 | 2.76 | −35 |

TABLE 3

| Ex. No. | PPA pbw | PPA mw | PTMT pbw | PTMT mw | HDI pbw | NCO/OH | E, Kg/cm² | TS, Kg/cm² | Ult. El. % | Tension Set, % | DSC mr,° C | DSC mp,° C | DSC rp,° C | Torsion Pend. Tx100 70° C | Torsion Pend. Tg,° C |
|---|---|---|---|---|---|---|---|---|---|---|---|---|---|---|---|
| 1 | 36.8 | 2290 | 56.5 | 3410 | 6.6 | 1.21 | 956 | 527 | 720 | 28 | 130–204 | 189 | 125 | | |
| 2 | 42.3 | 1690 | 48.6 | 2090 | 9.2 | 1.13 | 380 | 378 | 830 | 19 | 112–196 | 166 | 84 | | |
| 3 | 42.0 | 1690 | 50.6 | 5470 | 7.4 | 1.28 | 617 | 409 | 780 | 20 | 140–208 | 190 | 122 | 3.57 | −5 |
| 4 | 42.4 | 1690 | 51.0 | 5470 | 6.6 | 1.13 | 497 | 430 | 800 | 19 | 120–208 | 183 | 113 | | |
| 5 | 44.5 | 3240 | 48.7 | 2090 | 6.8 | 1.09 | 375 | 319 | 950 | 21 | 114–204 | 176 | 102 | | |
| 6 | 44.1 | 3240 | 48.3 | 2090 | 7.6 | 1.23 | 375 | 375 | 780 | 16 | 100–198 | 174 | 87 | 4.15 | −5 |
| 7 | 44.7 | 3240 | 51.2 | 5470 | 4.2 | 1.07 | 562 | 465 | 840 | 20 | 120–212 | 192 | 118 | | |
| 8 | 44.4 | 3240 | 50.9 | 5470 | 4.7 | 1.21 | 549 | 431 | 820 | 19 | 120–212 | 197 | 130 | 3.16 | −5 |
| 9 | 47.3 | 1110 | 42.1 | 3410 | 10.5 | 1.14 | 325 | 425 | 740 | 13 | 110–196 | 168 | 92 | | |
| 10 | 50.3 | 2290 | 39.3 | 1340 | 10.4 | 1.21 | 259 | 320 | 760 | 13 | 110–186 | 158 | 70 | | |
| 11 | 51.0 | 2290 | 42.8 | 3410 | 6.2 | 1.06 | 300 | 354 | 870 | 14 | 140–206 | 176 | 96 | | |
| 12 | 50.1 | 2290 | 42.0 | 3410 | 7.8 | 1.36 | 374 | 325 | 810 | 15 | 120–205 | 195 | 129 | | |
| 13 | 50.7 | 2290 | 43.9 | 10560 | 5.4 | 1.21 | 350 | 356 | 910 | 16 | 122–212 | 181 | 100 | | |
| 14 | 57.5 | 1690 | 33.0 | 2090 | 9.5 | 1.14 | 132 | 211 | 1060 | 14 | 110–188 | 150 | 80 | | |
| 15 | 56.8 | 1690 | 32.6 | 2090 | 10.6 | 1.28 | 155 | 287 | 870 | 11 | 110–184 | 155 | — | 2.82 | −8 |
| 16 | 57.6 | 1690 | 34.6 | 5470 | 7.7 | 1.14 | 194 | 276 | 900 | 11 | 120–216 | 188 | 130 | | |
| 17 | 57.1 | 1690 | 34.3 | 5470 | 8.7 | 1.29 | 212 | 340 | 920 | 11 | 118–205 | 180 | 110 | 4.62 | −7 |
| 18 | 60.2 | 1690 | 32.8 | 2090 | 7.0 | 1.21 | 149 | 281 | 1040 | 12 | 110–190 | 150 | — | 3.55 | −5 |
| 19 | 60.7 | 3240 | 33.1 | 2090 | 6.2 | 1.07 | 114 | 176 | 1250 | 13 | 116–190 | 148 | 106 | | |
| 20 | 60.8 | 3240 | 34.8 | 5470 | 4.4 | 1.05 | 157 | 276 | 1110 | 11 | 150–220 | 186 | 123 | | |
| 21 | 60.5 | 3240 | 34.6 | 5470 | 5.0 | 1.19 | 175 | 295 | 1060 | 13 | 112–220 | 192 | 118 | 4.50 | −15 |
| 22 | 68.9 | 2290 | 23.5 | 3410 | 7.5 | 1.21 | 57 | 233 | 1040 | 8 | 160–190 | 175 | — | | |

TABLE 4

| Ex. No. | P-1,3-BA pbw | P-1,3-BA mw | PTMT pbw | PTMT mw | HDI pbw | NCO/OH | E, Kg/cm² | TS, Kg/cm² | Ult. El. % | Tension Set, % | DSC mr,° C | DSC mp,° C | DSC rp,° C | H,Cal/g | Tor. Pen. Tx100 at 70° C | Tor. Pen. Tg,° C |
|---|---|---|---|---|---|---|---|---|---|---|---|---|---|---|---|---|
| 1 | 38.2 | 3240 | 57.5 | 3410 | 4.2 | 1.20 | 816 | 429 | 660 | 27 | 120–210 | 192 | 112 | 4.46 | | |
| 2 | 51.8 | 3240 | 42.5 | 3410 | 5.7 | 1.20 | 324 | 333 | 810 | 15 | 120–206 | 180 | 96 | 3.02 | | |
| 3 | 70.6 | 3240 | 23.6 | 3410 | 5.8 | 1.20 | 65 | 120 | 1070 | 9 | 118–200 | 160 | — | 0.96 | | |
| 4 | 49.4 | 1710 | 42.3 | 3410 | 8.3 | 1.20 | 343 | 348 | 730 | 15 | 110–190 | 162 | — | 2.95 | | |
| 5 | 53.0 | 5470 | 42.6 | 3410 | 4.5 | 1.20 | 392 | 317 | 860 | 16 | 120–214 | 190 | 123 | 4.21 | | |
| 6 | 51.5 | 3240 | 39.4 | 1340 | 9.1 | 1.20 | 270 | 294 | 750 | 14 | 98–184 | 150 | — | 2.76 | | |
| 7 | 51.8 | 3240 | 42.2 | 3050 | 6.0 | 1.20 | 292 | 352 | 820 | 14 | — | 174 | — | — | | |
| 8 | 51.7 | 3240 | 43.3 | 5470 | 5.0 | 1.20 | 300 | 351 | 850 | 17 | — | 187 | — | — | | |
| 9 | 51.9 | 3240 | 44.0 | 10562 | 4.1 | 1.20 | 340 | 301 | 840 | 20 | 120–209 | 175 | 95 | 3.58 | | |
| 10 | 42.8 | 2180 | 48.1 | 2090 | 9.1 | 1.27 | 374 | 388 | 720 | 17 | 120–198 | 172 | 90 | 3.80 | 2.29 | 0 |
| 11 | 43.0 | 2180 | 50.7 | 5470 | 6.2 | 1.27 | 660 | 447 | 710 | 21 | 116–206 | 189 | 123 | 5.36 | 3.02 | −5 |
| 12 | 44.6 | 4480 | 48.3 | 2090 | 7.1 | 1.27 | 389 | 368 | 740 | 19 | 130–200 | 185 | — | 1.22 | 2.50 | −5 |
| 13 | 44.9 | 4480 | 51.0 | 5470 | 4.1 | 1.27 | 505 | 349 | 740 | 22 | 120–220 | 195 | 112 | 5.07 | 3.46 | −10 |

TABLE 4-continued

| Ex. No. | P-1, 3-BA pbw | P-1, 3-BA mw | PTMT pbw | PTMT mw | HDI pbw | NCO/OH | E, Kg/cm² | TS, Kg/cm² | Ult. El. % | Tension Set, % | DSC mr, °C | DSC mp, °C | DSC rp, °C | H,Cal/g | Tor. Pen. Tx100 at 70° C | Tor. Pen. Tg °C |
|---|---|---|---|---|---|---|---|---|---|---|---|---|---|---|---|---|
| 14 | 64.1 | 2180 | 35.9 | 2090 | 10.0 | 1.27 | 161 | 208 | 720 | 12 | 112–182 | 150 | — | 1.59 | 2.20 | −20 |
| 15 | 58.5 | 2180 | 34.4 | 5470 | 7.1 | 1.27 | 205 | 234 | 840 | 11 | 120–200 | 176 | — | 5.40 | 3.65 | −10 |
| 16 | 60.8 | 4480 | 32.9 | 2090 | 6.3 | 1.27 | 158 | 268 | 910 | 12 | 115–200 | 168 | — | 2.17 | 3.00 | −15 |
| 17 | 61.1 | 4480 | 34.6 | 5470 | 4.3 | 1.27 | 187 | 175 | 950 | 13 | 116–207 | 162 | — | 3.15 | 7.82 | −20 |

The data indicate that polymers containing high proportions of low-melting polyester exhibit low stiffness (E), higher elongation, lower tension set and lower glass transition temperatures and that polymers containing high proportions of high-melting polyester (TPMT) exhibit higher tensile strength and higher melt peaks. The data further indicates that increasing either the molecular weight of the low-melting or high-melting polyester tends to increase the tensile strength of the resulting polymer. Moreover, increasing the molecular weights of both the low-melting and high-melting polyesters generally gives a linear segmented urethane polymer exhibiting higher melt peaks. The abbreviations "mr" means melting range, "mp" means melt peak and The data show that polymers are obtained exhibiting high tensile strengths and high melt peaks.

Polymers prepared by heating, above the melting point of PTMT, a slurry of powdered PTMT and hydroxy-terminated poly(tetramethylene ether) with hexamethylene diisocyanate are illustrated in Table 6. The data indicate that modulus, tensile strength and elongation increase with increasing amounts of poly(tetramethylene terephthalate) in the polymer. The polymers of Examples 3 and 4 containing 27.2 and 15.5 parts by weight PTMT, respectively, exhibit unexpectedly narrow melting ranges and high melt peaks in view of the small quantities of high-melting crystalline PTMT segments present.

TABLE 5

| Ex. No. | PEBA pbw | PEBA mw | PTMT pbw | PTMT mw | Diisocyanate pbw | Diisocyanate Type | M, kg/cm² | TS, Kg/cm² | Ult. El. % | Tension Set,% | DSC mr,° C | DSC mp,° C | DSC rp,° C |
|---|---|---|---|---|---|---|---|---|---|---|---|---|---|
| 1 | 52.2 | 5100 | 42.8 | 5470 | 5.0 | MDI | 420 | 475 | 800 | 14 | 156–215 | 200 | 148 |
| 2 | 52.0 | 5100 | 42.7 | 5470 | 5.2 | H12MDI | 356 | 359 | 990 | 18 | 152–212 | 190 | 110 |
| 3 | 53.0 | 5100 | 43.5 | 5470 | 3.5 | TDI | 446 | 455 | 900 | 16 | 130–208 | 182 | 115 |
| 4 | 53.1 | 5100 | 43.7* | 6110 | 3.3 | HDI | 214 | 465 | 860 | 19 | 154–220 | 190 | — |

*PET

TABLE 6

| Ex. No. | PTMG pbw | PTMG mw | PTMT pbw | PTMT mw | HDI pbw | E, kg/cm² | TS, kg/cm² | Ult. El. % | DSC mr,° C | DSC mp ° C | DSC rp, ° C |
|---|---|---|---|---|---|---|---|---|---|---|---|
| 1 | 40.0 | 620 | 46.6 | 3500 | 13.4 | 337 | 302 | 860 | 95–165 | 130 | 63 |
| 2 | 40.0 | 1020 | 50.2 | 3500 | 9.8 | 422 | 309 | 670 | 130–176 | 150 | — |
| 3 | 60.0 | 1020 | 27.2 | 3500 | 12.8 | 105 | 183 | 690 | 185–218 | 204 | 90 |
| 4 | 70.0 | 1020 | 15.5 | 3500 | 14.5 | 34 | 105 | 610 | 192–215 | 205 | 93 |
| 5 | 80.0 | 1020 | 3.8 | 3500 | 16.2 | 3 | 57 | 460 | 100–190 | 150 | 90 |

"rp" means recrystallization peak. The NCO/OH ratio over the range studied has only a moderate effect on polymer properties. All of the polymers exhibit low hysteresis as shown by Tan δ (T) at 70° C with polymers containing less than 60 weight percent of low-melting polyester exhibiting especially low hysteresis. Polymers containing poly(1/1 ethylene-co-1,4-butylene adipate) are preferred because they exhibit lower hysteresis and lower glass transition temperatures making them especially suitable for applications at room temperature or below and for applications in which the part is flexed repeatedly.

Polymers of the invention containing different diisocyanates are illustrated in Table 5. The polymers of Example 1 contains methylene diphenyl-4,4'-diisocyanate, the polymer of Example 2 contains methylene dicyclohexylene-4,4'-diisocyanate and the polymer of Example 3 contains tolylene-2,4-diisocyanate. Example 4 contains hexamethylene diisocyanate and poly(ethyleneterephthalate) in place of PTMT. In the four experiments, the molecular weight of both the high-melting and low-melting polyesters exceeds 5000 and the NCO/OH ratio is 1.1. The example numbers and reaction conditions of temperature (° C) and time (minutes) are (1,274,11); (2,263,11); (3,268,9) and (4,286,11).

The invention is further illustrated with different polyesters in Tables 7 and 8. The polymers are prepared as described above by preparing a slurry of a pulverulent high-melting polyester in a liquid polyester and reacting the two polyesters with an organic diisocyanate by heating the slurry to melt the high-melting polyester and to form segmented elastoplastic urethane polymers. Polymers prepared with different liquid polyesters of adipic acid are illustrated in Table 7. A polymer prepared with poly(tetramethylene naphthalene-2,6-dicarboxylate) instead of PTMT as the high-melting polyester is shown in Example 6 of Table 7. Polymers prepared with liquid polyesters of succinic acid, glutaric acid, azelaic acid, glutaric acid and caprolactone are illustrated in Table 8. The data show in polymers containing small quantities of low-melting polyester that increasing the proportion of liquid polyester by as little as 5 weight percent results in a substantial reduction in modulus and that the proportion of liquid polyester must exceed about thirty weight percent in order to obtain a polymer having a glass transition temperature of zero or below. The data indicate that polymers prepared from low-melting polyesters derived from diols with branched alkylene groups (alkyl substituted alkylene) exhibit higher melt peaks.

TABLE 7
POLYADIPATES

| Ex. No. | Low-Melting Polyadipate type | mw | pbw | PTMT mw | pbw | Diisocyanate type | pbw | E, Kg/cm² | TS, Kg/cm² | Ult. El. % | DSC mr, °C | mp, °C | rp, °C | Tg, °C |
|---|---|---|---|---|---|---|---|---|---|---|---|---|---|---|
| 1 | PDMPA | 1600 | 20.0 | 4000 | 74.6 | TDI | 5.4 | 3164 | 471 | 530 | 190-222 | 211 | 153 | 35 |
| 2 | P-1,3-BA | 700 | 20.0 | 3800 | 71.7 | TDI | 8.3 | 2320 | 485 | 490 | 146-200 | 180 | 90 | 35 |
| 3 | P-1,3-BA | 1800 | 20.0 | 3800 | 74.6 | TDI | 5.4 | 2109 | 394 | 560 | 160-214 | 193 | 107 | 40 |
| 4 | PODEA | 1100 | 20.0 | 3800 | 73.5 | TDI | 6.5 | 4992 | 584 | 560 | 110-170 | 145 | — | — |
| 5 | PTMA | 2500 | 20.0 | 3800 | 75.2 | TDI | 4.8 | 2883 | 415 | 550 | 152-192 | 182 | 113 | — |
| 6 | PTMA | 2000 | 20.0 | 3600* | 74.6* | TDI | 5.4 | 5273 | 380 | 310 | 192-232 | 222 | 155 | 55 |
| 7 | PEA | 1800 | 20.0 | 3500 | 69.3 | HDI | 5.7 | 1195 | 471 | 700 | 112-188 | 163 | 81 | 10 |
| 8 | POPA | 1500 | 25.0 | 3500 | 68.9 | HDI | 6.1 | 1336 | 464 | 610 | 180-215 | 205 | 138 | — |
| 9 | PTEGA | 1800 | 25.0 | 3500 | 69.3 | HDI | 5.7 | 1336 | 295 | 640 | 156-200 | 174 | 140 | — |
| 10 | PTTGA | 700 | 25.0 | 3500 | 65.8 | HDI | 9.2 | 984 | 288 | 460 | 135-180 | 162 | 82 | — |
| 11 | PTMA | 2000 | 25.0 | 3500 | 69.6 | HDI | 5.4 | 1828 | 415 | 650 | 170-220 | 200 | 148 | 10 |
| 12 | PTMA | 2000 | 50.0 | 3500 | 42.6 | HDI | 7.4 | 464 | 450 | 810 | 160-210 | 186 | 120 | — |

*PTMND

TABLE 8

| Ex. No. | Low-melting Polyester type | mw | pbw | PTMT mw | pbw | Diisocyanate type | pbw | E, Kg/cm² | TS, Kg/cm² | Ult. El. % | DSC mr, °C | mp, °C | rp, °C | Tg, °C |
|---|---|---|---|---|---|---|---|---|---|---|---|---|---|---|
| 1 | POES | 700 | 20.0 | 3800 | 71.7 | TDI | 8.3 | 1898 | 337 | 480 | 118-160 | 144 | — | — |
| 2 | P-1,3-BAZ | 800 | 20.0 | 3800 | 72.3 | TDI | 7.7 | 3023 | 373 | 410 | 150-200 | 182 | — | — |
| 3 | PTMAZ | 800 | 20.0 | 3800 | 72.3 | TDI | 7.7 | 3375 | 429 | 450 | 140-190 | 174 | 95 | 40 |
| 4 | P-1,3-BSE | 800 | 20.0 | 3800 | 72.3 | TDI | 7.7 | 2742 | 345 | 450 | 150-210 | 189 | 97 | — |
| 5 | PCL | 1900 | 20.0 | 3800 | 74.8 | TDI | 5.2 | 1547 | 415 | 490 | 120-180 | 154 | 76 | 33 |
| 6 | P-1,3-BS | 700 | 25.0 | 3800 | 66.3 | TDI | 8.7 | 2600 | 401 | 510 | 164-204 | 188 | 117 | — |
| 7 | PPMG | 1500 | 25.0 | 3500 | 68.9 | HDI | 6.1 | 914 | 330 | 550 | 140-186 | 163 | 88 | 10 |
| 8 | PBGA | 1000 | 25.0 | 3500 | 67.5 | HDI | 7.5 | 1090 | 387 | 490 | 160-202 | 183 | 96 | 20 |
| 9 | PDMPG | 3000 | 25.0 | 3500 | 70.2 | HDI | 4.8 | 661 | 366 | 540 | 120-158 | 130 | 90 | 20 |
| 10 | PPGL | 900 | 25.0 | 3500 | 67.1 | HDI | 7.9 | 914 | 281 | 560 | 132-185 | 158 | — | 20 |
| 11 | PTMAZ | 700 | 25.0 | 3500 | 65.8 | HDI | 9.2 | 914 | 323 | 480 | 115-168 | 143 | — | 15 |
| 12 | PTMSE | 900 | 25.0 | 3500 | 67.1 | HDI | 7.9 | 984 | 169 | 150 | 104-154 | 135 | — | 15 |
| 13 | PTMS | 650 | 25.0 | 3500 | 65.4 | HDI | 9.6 | 914 | 337 | 400 | 106-150 | 135 | — | 20 |
| 14 | PMG | 850 | 30.0 | 3500 | 61.1 | HDI | 8.9 | 844 | 337 | 520 | 120-156 | 140 | 88 | 0 |
| 15 | PEPG | 925 | 40.0 | 3500 | 50.2 | HDI | 9.2 | 337 | 225 | 500 | 162-216 | 202 | 138 | — |

TABLE 9

| Ex. No. | PEBA pbw | mw | PTMT pbw | mw | Diisocyanate pbw | type | E, Kg/cm² | TS, Kg/cm² | Ult. El. % | DSC mr, °C | mp, °C | rp, °C | Rheovibron Tx100 at 60° C | Tg, °C |
|---|---|---|---|---|---|---|---|---|---|---|---|---|---|---|
| 1 | 50.0 | 2000 | 42.8 | 2500 | 8.2 | HDI | 450 | 442 | 860 | 150-220 | 203 | 126 | 3.2 | −28 |
| 2 | 49.5 | 2000 | 42.4 | 2500 | 8.1 | HDI | 450 | 313 | 600 | 123-176 | 150 | 60 | 2.3 | −30 |
| 3 | 50.0 | 2000 | 37.5 | 2000 | 12.5 | MDI | 371 | 494 | 590 | 160-204 | 180 | 115 | 3.8 | −10 |
| 4 | 50.0 | 2000 | 37.5 | 2000 | 12.5 | MDI | 381 | 539 | 630 | 150-192 | 177 | 103 | 2.8 | −20 |
| 5 | 50.0 | 2000 | 42.7 | 2500 | 7.3 | TDI | 541 | 356 | 940 | 180-226 | 210 | 150 | 6.2 | −20 |
| 6 | 50.0 | 2000 | 42.7 | 2500 | 7.3 | TDI | 302 | 312 | 790 | 85-170 | 140 | — | 4.4 | −7 |
| 7 | 74.2 | 2000 | 17.3 | 2500 | 8.5 | HDI | 98 | 310 | 920 | 120-210 | 180 | 106 | 6.6 | −40 |
| 8 | 74.2 | 2000 | 17.3 | 2500 | 8.4 | HDI | 81 | 215 | 820 | — | — | — | 4.6 | −37 |
| 9 | 72.9 | 2000 | 14.9 | 2500 | 12.2 | MDI | 93 | 275 | 730 | 122-210 | 179 | — | 5.0 | −25 |
| 10 | 72.9 | 2000 | 14.9 | 2500 | 12.2 | MDI | 97 | 249 | 720 | — | — | — | 3.4 | −25 |
| 11 | 74.8 | 2000 | 17.2 | 2500 | 8.0 | TDI | 70 | 195 | 1090 | — | — | — | 12.9* | −32 |
| 12 | 75.0 | 2000 | 17.0 | 2500 | 8.0 | TDI | 85 | 212 | 830 | — | — | — | 6.2 | −26 |
| 13 | 19.8 | 2000 | 73.3 | 2500 | 6.9 | HDI | 2004 | 489 | 620 | 140-216 | 204 | 147 | 2.8 | 14 |
| 14 | 19.8 | 2000 | 73.2 | 2500 | 6.9 | HDI | 1399 | 390 | 510 | 140-192 | 160 | 74 | 4.0 | 18 |
| 15 | 19.8 | 2000 | 70.3 | 2500 | 10.0 | MDI | 1898 | 482 | 420 | 122-210 | 193 | 129 | 10.0 | 43 |
| 16 | 19.8 | 2000 | 70.3 | 2500 | 10.0 | MDI | 1441 | 434 | 420 | 128-170 | 153 | 85 | 14.0 | 40 |
| 17 | 20.0 | 2000 | 73.5 | 2500 | 6.6 | TDI | 2918 | 443 | 540 | 180-222 | 209 | 152 | 8.8 | 40 |
| 18 | 20.0 | 2000 | 73.5 | 2500 | 6.6 | TDI | 1821 | 403 | 550 | 127-178 | 160 | 95 | 8.5 | 34 |

*interpolated value

Polymers prepared by the slurry process of this invention are compared in Table 9 with polymers prepared in an inert solvent according to Example 1 of U.S. Pat. No. 3,553,172. The compositions are the same to the extent that the ingredients and proportions are the same, however, the data demonstrate differences in properties indicating that the polymers are structurally different. The low-melting polyester is poly(1/1 ethylene-co-1,4-butylene adipate). In addition to preparing polymers with methylene-diphenyl-4,4'-diisocyanate of the patent, polymers are also prepared with toluene diisocyanate and hexamethylene diisocyanate. The data is obtained on samples prepared by compression molding. Samples prepared by casting from solution as described in the patent are also prepared but the data are not shown since the hysteresis of the cast samples is even higher than the same material press molded. The odd-numbered examples are prepared in nitrobenzene in accordance to the patent and the even-numbered examples are prepared in a slurry in accordance to this invention. The data show that polymers prepared by the slurry process containing less than 50 weight percent of PTMT exhibit lower hysteresis than polymers of similar composition prepared in an inert solvent. In addition, the polymers of the invention exhibiting lower hysteresis also exhibit greater oil resistance than the corresponding polymers prepared in an inert solvent.

Although the invention has been illustrated by typical examples, it is not limited thereto. Changes and modifications of the examples of the invention herein chosen for purposes of disclosure can be made which do not constitute departure from the spirit and scope of the invention. For example, comparable results to those in the tables illustrating the invention are obtained with mixtures of two or more low-melting liquid polyesters, with mixtures of low-melting liquid polyester and liquid polyether and with low-melting liquid copolyesters prepared with more than one dicarboxylic acid, anhydride of dicarboxylic acid or lower alkyl ester of dicarboxylic acid.

The embodiments of the invention in which an exclusive property or privilege is claimed are defined as follows:

1. A process for the preparation of elastoplastic urethane polymer comprising heating a slurry of
   (a) about 10 to about 90 parts by weight of at least one liquid polydiol having a melting or softening point of about 100° C or below and a molecular weight of from about 500 to about 12,000 selected from the group consisting of dihydroxy polyether and dihydroxy polyester,
   (b) about 90 to about 10 parts by weight of a pulverulent solid dihydroxy polyester having a melting point of at least 200° C and a molecular weight of from about 500 to about 12,000, per 100 total parts by weight of (a) and (b) and
   (c) an organic diisocyanate in the quantity such that the number of NCO groups is equal to or exceeds the number of OH groups of (a) and (b), to a temperature sufficient to melt (b) for a time sufficient to form an essentially linear segmented urethane polymer, and cooling the polymer before substantial degradation occurs.

2. The process of claim 1 in which the solid polyester melts at about 225° C or above.

3. The process of claim 2 which comprises continuously feeding the slurry to a zone heated to 250° C or above and continuously withdrawing molten urethane polymer.

4. The process of claim 3 in which slurry is fed to one end of the heated zone and withdrawing molten polymer from the other end of the heated zone wherein the total elapsed time within the heated zone is 30 minutes or less.

5. The process of claim 4 comprising feeding slurry to a zone heated to 280° C or above at such a rate that the total elapsed time within the heated zone is 15 minutes or less, withdrawing molten polymer and cooling it to below 200° C.

6. The process of Claim 4 in which the quantity of (c) is such that the number of NCO groups exceeds the number of OH groups of (a) and (b).

7. The process of Claim 6 in which the slurry comprises (b) having a molecular weight from about 1000 to about 12,000.

8. The process of claim 7 in which the slurry comprises about 40 to about 80 weight percent of (a), about 60 to about 10 weight percent of (b) and about 2 to about 15 weight percent of (c).

9. The process of claim 8 in which at least one of (a) and (b) has a molecular weight of at least about 1800 and the sum of the molecular weights of (a) and (b) is less than about 14,000.

10. The process of claim 9 in which the slurry comprises about 50 to about 75 weight percent of (a) and about 50 to about 25 weight percent of (b) wherein the molecular weights of (a) and (b) are between about 1800 and about 5500.

11. The process of claim 10 in which (c) is a symmetrical diisocyanate.

12. The process of claim 11 in which (b) is poly(tetramethyleneterephthalate).

13. The process of claim 11 in which (b) is poly(ethyleneterephthalate).

14. The process of claim 12 in which (a) is poly(1/1 ethylene-co-butylene adipate).

15. The process of claim 13 in which (a) is poly(1/1 ethylene-co-butylene adipate).

16. The process of claim 14 in which (c) is 1,6-hexamethylene diisocyanate.

17. The process of claim 15 in which (c) is 1,6-hexamethylene diisocyanate.

18. The process of claim 2 in which the average diameter of the pulverulent solid polyester is one millimeter or less.

19. A segmented elastoplastic urethane polymer prepared by heating at 225° C or above a slurry consisting essentially of
   (a) about 40 to about 80 weight percent of at least one liquid polyester of the formula

or liquid polyether of the formula $H(OR_3)_nH$ wherein R is alkylene of 2 to 10 carbon atoms or said alkylene interrupted by oxygen, $R_1$ is alkylene of 2 to 8 carbon atoms, $R_2$ is alkylene of 2-4 carbon atoms and $n$ is 2 to about 50,
   (b) about 60 to about 10 weight percent hydroxy-terminated poly(tetramethyleneterephthalate) or hydroxy-terminated poly(ethyleneterephthalate) having a molecular weight from about 1000 to about 12,000, and
   (c) about 2 to about 15 weight percent organic diisocyanate
wherein the NCO/OH ratio is one or more, for a time sufficient to form essentially linear segmented urethane polymer.

20. The polymer of claim 19 prepared by heating the slurry at 250° C or above.

21. The polymer of claim 20 in which (a) is a polyester.

22. The polymer of claim 21 wherein the NCO/OH ratio is between about 1.1 and 1.3.

23. The polymer of claim 22 having a hysteresis measured by dynamic viscoelastometer at 60° C of 75% or less of the hysteresis of a similar polymer prepared in inert solvent using the same ingredients and proportions.

24. The polymer of claim 23 in which the molecular weights of (a) and (b) are between about 1800 to about 6000.

25. The polymer of claim 24 in which (a) melts below about 50° C.

26. The polymer of claim 25 in which at least one of (a) and (b) has a molecular weight exceeding 3000.

27. The polymer of claim 26 in which the sum of the molecular weights of (a) and (b) exceeds 5000.

28. The polymer of claim 27 in which the molecular weights of both (a) and (b) exceed 3000.

29. The polymer of claim 25 which comprises about 50 to about 75 weight percent of (a) and about 50 to about 25 weight percent of (b).

30. The polymer of claim 29 in which (c) is a symmetrical diisocyanate.

31. The polymer of claim 30 in which (b) is poly(tetramethyleneterephthalate).

32. The polymer of claim 30 in which (b) is poly(ethyleneterephthalate).

33. The polymer of claim 31 in which (a) is poly(1/1 ethylene-co-butylene adipate).

34. The polymer of claim 32 in which (a) is poly(1/1 ethylene-co-butylene adipate).

35. The polymer of claim 33 in which (c) is 1,6-hexamethylene diisocyanate.

36. The polymer of claim 34 in which (c) is 1,6-hexamethylene diisocyanate.

37. The polymer of claim 20 in which (b) is a pulverulent solid having an average diameter of 1 millimeter or less.

* * * * *